(12) United States Patent
Martin et al.

(10) Patent No.: US 9,346,383 B2
(45) Date of Patent: May 24, 2016

(54) LOCKING DEVICE FOR A HEADREST

(71) Applicant: Johnson Controls GmbH, Burscheid (DE)

(72) Inventors: Patrick Martin, Braintree (GB); Richard Johnathan Howells, Danbury (GB); Ivan Jakubec, Trnava (SK)

(73) Assignee: JOHNSON CONTROLS GMBH, Burscheid (DE)

( * ) Notice: Subject to any disclaimer, the term of this patent is extended or adjusted under 35 U.S.C. 154(b) by 0 days.

(21) Appl. No.: 14/386,660

(22) PCT Filed: Mar. 21, 2013

(86) PCT No.: PCT/EP2013/055919
§ 371 (c)(1),
(2) Date: Sep. 19, 2014

(87) PCT Pub. No.: WO2013/139902
PCT Pub. Date: Sep. 26, 2013

(65) Prior Publication Data
US 2015/0076884 A1    Mar. 19, 2015

(30) Foreign Application Priority Data

Mar. 22, 2012  (DE) .......................... 10 2012 005 626
Jun. 28, 2012  (DE) .......................... 10 2012 012 867

(51) Int. Cl.
*B60N 2/427*  (2006.01)
*B60N 2/48*   (2006.01)
*B60N 2/42*   (2006.01)

(52) U.S. Cl.
CPC ............ *B60N 2/4811* (2013.01); *B60N 2/4249* (2013.01); *B60N 2/4817* (2013.01); *B60N 2002/4897* (2013.01)

(58) Field of Classification Search
CPC ............... B60N 2/4814; B60N 2/4817; B60N 2002/4897; B60N 2/4249
USPC .................................... 297/216.12, 391, 410
See application file for complete search history.

(56) References Cited

U.S. PATENT DOCUMENTS

| 5,823,623 A | * | 10/1998 | Beck | .................... | B60N 2/4814 297/410 |
| 6,454,356 B1 | * | 9/2002 | Yamada | ............... | B60N 2/4814 297/391 |

(Continued)

FOREIGN PATENT DOCUMENTS

| DE | 102005012896 A1 | 9/2006 |
| DE | 102008064462 A1 | 6/2010 |
| EP | 0582765 A1 | 2/1994 |

OTHER PUBLICATIONS

Office Action dated Oct. 10, 2012 in corresponding German Patent Application No. 10 2012 012 867.3.

(Continued)

*Primary Examiner* — Peter Brown
(74) *Attorney, Agent, or Firm* — Foley & Lardner LLP

(57) ABSTRACT

A locking device for a headrest has a headrest rod, a guide sleeve for the headrest rod and a blocking element. The blocking element is displaceable relative to the guide sleeve between a locking position, in which the blocking element is in engagement with a recess in the headrest rod, and a unlocking position, in which the blocking element is not in engagement with recesses in the headrest rod. The blocking element is pivotable in relation to the guide sleeve about an axis of rotation parallel to the headrest rod. The blocking element is mounted in the guide sleeve such that, when there is a relative rotational movement between the guide sleeve and the headrest rod, the blocking element rotates at least partially jointly in conjunction with the headrest rod about the axis of rotation.

7 Claims, 2 Drawing Sheets

(56) References Cited

U.S. PATENT DOCUMENTS

| | | | | |
|---|---|---|---|---|
| 6,742,846 B1 * | 6/2004 | Isaacson | ............... | B60N 2/4814 297/410 |
| 7,121,626 B2 * | 10/2006 | Akehi | .................. | B60N 2/4817 297/410 |
| 7,669,933 B2 * | 3/2010 | Watanabe | ............ | B60N 2/4817 297/410 |
| 7,914,080 B2 * | 3/2011 | Runde | .................. | B60N 2/4814 297/410 |
| 2006/0214492 A1 * | 9/2006 | Hassler | ................ | B60N 2/4814 297/410 |
| 2008/0001456 A1 * | 1/2008 | Muller | ..................... | B60N 2/20 297/354.1 |
| 2009/0243364 A1 * | 10/2009 | Brunner | ............... | B60N 2/4814 297/408 |

OTHER PUBLICATIONS

International Search Report in PCT/EP2013/055919 dated Jun. 7, 2013.

International Preliminary Report on Patentability and Written Opinion of the International Searching Authority in PCT/EP2013/055919 dated Sep. 23, 2014, 8 pages.

* cited by examiner

LOCKING DEVICE FOR A HEADREST

CROSS REFERENCE TO RELATED APPLICATIONS

The present application is a U.S. National Stage of International Application No. PCT/EP2013/055919 filed on Mar. 21, 2013, which claims the benefit of German Patent Application Nos. 10 2012 005 626.5 filed on Mar. 22, 2012, and 10 2012 012 867.3 filed on Jun. 28, 2012, the entire disclosures of all of which are incorporated herein by reference.

PRIOR ART

The invention relates to a locking device for a headrest, wherein the locking device has a blocking element which is provided for engagement with a recess in a headrest rod of the headrest.

Such locking devices are known in general, for example from the documents DE 10 2005 012 896 A1 and DE 10 2008 064 462 A1. Headrests frequently have two headrest rods which extend in parallel from a head contact cushion in the direction of a backrest and are held in a height-adjustable manner in corresponding guide sleeves of the backrest. In order to fix the headrest at a desired height, at least one headrest rod is provided with recesses in which a blocking element of the guide sleeve can engage in an interlocking manner. The blocking element is pretensioned in a spring-elastic manner in the direction of the recess. The user can disengage the blocking element from the recess counter to the spring force by means of an actuating element in order to be able to unlock the locking device and to be able to undertake a height adjustment of the headrest. The user can release the actuating element again into the desired position, and therefore the blocking element latches into a corresponding recess and locks the locking device again.

A disadvantage of locking devices of this type that are known from the prior art is that, when the headrest rods are rotated in relation to the guide sleeves, an undesirable unlocking of the locking device may occur. In particular in the event of an accident, high acceleration forces may occur, as a result of which such a rotation may occur. If the headrest rods are unlocked, the headrest is freely movable and may even be pushed entirely out of the guide sleeve. This constitutes a considerable risk of injury to the vehicle occupant sitting on the vehicle seat.

DISCLOSURE OF THE INVENTION

It is the object of the present invention to provide a locking device for a headrest, in which an inadvertent unlocking due to relative rotational movements between a headrest rod and a guide sleeve is prevented.

This object is achieved by a locking device for a headrest, which locking device has a headrest rod, a guide sleeve for the headrest rod and a blocking element, wherein the blocking element is movable relative to the guide sleeve between a locking position, in which the blocking element is in engagement with a recess in the headrest rod, and an unlocking position, in which the blocking element is disengaged from recesses in the headrest rod, wherein the blocking element is designed to be pivotable in relation to the guide sleeve about an axis of rotation parallel to the headrest rod.

In an advantageous manner, during a relative rotational movement between the guide sleeve and the headrest rod, the blocking element is capable of at least partially rotating together with the headrest rod, since the blocking element is mounted rotatably about the axis of rotation. Avoiding the joint rotation of headrest rod and blocking element has the consequence that the position of the blocking element in the recess of the headrest rod is not changed, or is at least changed less significantly, and therefore the locking device is not unlocked. In other words: the blocking element is mounted in the guide sleeve in such a manner that the blocking element can carry out a compensating rotation in relation to the guide sleeve, and therefore a rotation of the headrest rod is at least partially compensated for.

According to a preferred embodiment of the present invention, the blocking element is mounted rotatably about the axis of rotation by an angle of between 5 and 40 degrees, preferably between 10 and 20 degrees and particularly preferably of essentially 15 degrees in relation to the guide sleeve.

According to a preferred embodiment of the present invention, it is provided that the blocking element comprises a blocking bolt and an actuating element, wherein the actuating element comprises an outer segment and an inner segment, which are connected rigidly to each other. The outer segment is preferably designed with rounded edges and/or is of semi-circular design. The inner segment in particular surrounds the headrest rod and has the blocking bolt on a side facing away from the outer segment. For the actuation, the actuating element is movable along a main direction of movement which extends in a plane perpendicular to the axial direction of the headrest rod. The inner segment and the outer segment are preferably coupled rigidly to each other via two webs extending parallel to the main direction of movement.

According to a preferred embodiment of the present invention, it is provided that the guide sleeve has two guide channels which extend parallel to the main direction of movement and in which free limbs of the outer segment are displaceably guided. The limbs preferably have a curvature and/or rounded edges, and therefore guidance of the actuating element parallel to the main direction of movement is advantageously achieved and at the same time rotation of the actuating element relative to the guide sleeve about the axis of rotation, for example in the event of an accident, is made possible. In particular, a spring means which pretensions the blocking element into the locking position is arranged on a side of the actuating element that faces away from the outer segment.

Further details, features and advantages of the invention emerge from the drawings, and from the description below of preferred embodiments with reference to the drawings. The drawings here merely illustrate exemplary embodiments of the invention which do not limit the essential inventive concept.

EMBODIMENTS OF THE INVENTION

Figure 1:
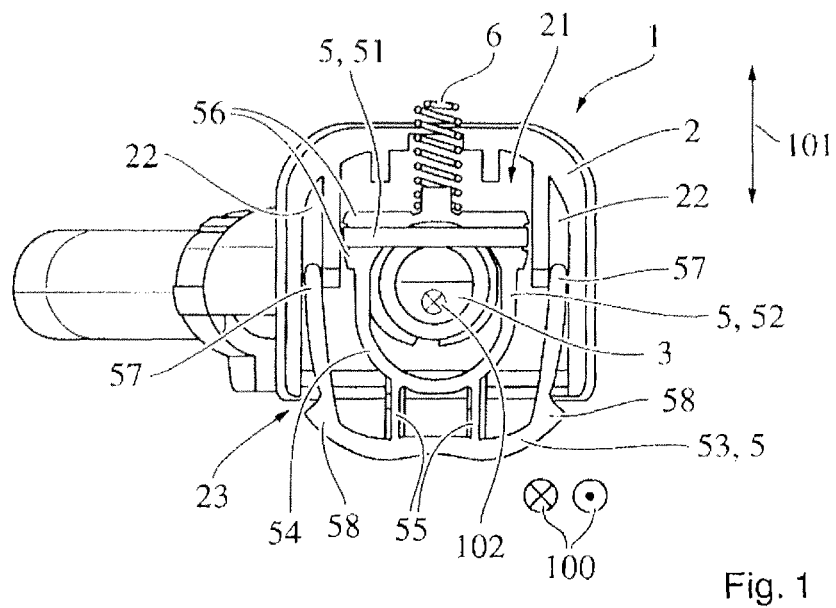
FIG. 1 shows a schematic perspective view of a locking device according to an exemplary embodiment of the invention.
Figure 2:
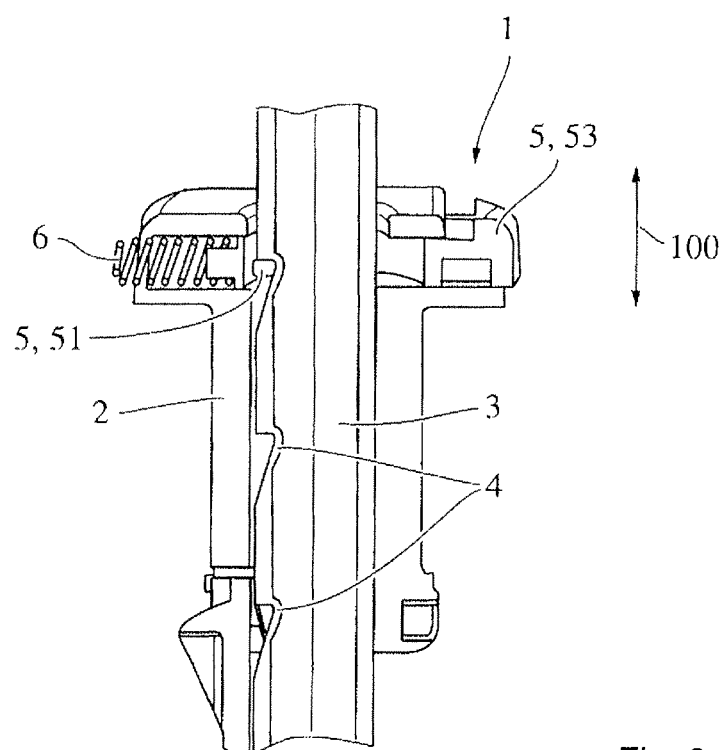
FIG. 2 shows a schematic sectional image view of the locking device according to the exemplary embodiment of the invention.

FIGS. 1 and 2 illustrate schematic views of a locking device 1 for a headrest (not illustrated) according to an exemplary embodiment. The locking device 1 has a guide sleeve 2 in which a headrest rod 3 for supporting a head contact part (not illustrated) is fastened. The headrest rod 3 comprises a tube or a solid material cylinder, on the outer circumferential surface of which wedge-shaped recesses 4 are provided at uniform distances along the axial direction 100 of the headrest rod 3.

The headrest rod 3 is mounted displaceably in the axial direction 100 in the guide sleeve 2. The guide sleeve 2 is preferably embedded (not illustrated) in the upper side of a backrest of a vehicle seat. The locking device 1 has a blocking element 5 which is mounted displaceably in relation to the guide sleeve 2 along a transverse direction 101 perpendicular to the axial direction 100. The blocking element 5 comprises a blocking bolt 51 and an actuating element 52. The blocking element 5 is movable along the transverse direction 101 between a locking position (see FIGS. 1 and 2), in which the blocking bolt 51 is in engagement with one of the recesses 4, and an unlocking position (not illustrated), in which the blocking bolt 51 is disengaged from the recesses 4. In the locking position, a movement of the headrest rod 3 in the axial direction 100 is prevented, whereas, in the unlocking position, the headrest rod 3 is displaceable in the axial direction 100, for example in order to adjust the height of the headrest of the vehicle seat. The blocking element 5 is pretensioned in a spring-elastic manner in the direction of the locking position by means of a spring element 6. By means of a manual actuation of the actuating element 52 along the transverse direction 101, the blocking bolt 51 is moved from the locking position into the unlocking position.

The actuating element 52 comprises an outer segment 53 and an inner segment 54, which are coupled rigidly to each other via two webs 55 extending parallel to the transverse direction 101. The inner segment 54 surrounds the headrest rod 3 in a plane perpendicular to the axial direction 100. The blocking bolt 51 is arranged on a side of the inner segment 54 that faces away from the outer segment 53, and extends both perpendicularly to the axial direction 100 and perpendicularly to the transverse direction 101. A guide region 56 of the inner segment is guided displaceably in the transverse direction 101 together with the blocking bolt 51 in a guide receptacle 21 in the guide sleeve 2. The outer segment 53 is of semi-circular design and has two limbs 57 extending along the transverse direction 101 into the guide sleeve 2. The limbs 57 are guided in guide channels 22 of the guide sleeve 2, the guide channels extending in the transverse direction 101. The limbs 57 have a curvature and rounded edges, and therefore the actuating element 52 can rotate in relation to the guide sleeve 2 about an axis of rotation 102 parallel to the axial direction 100. For this purpose, limiting edges 58 of the actuating element 52 are furthermore designed to be spaced apart from the insertion edges 23 of the guide sleeve 2. Furthermore, the edges of the actuating element 52 are all rounded.

If the headrest rod 3 rotates in relation to the backrest of the vehicle seat, for example due to acceleration forces caused by an accident, the actuating element 52, and therefore also the blocking bolt 51, can move over a certain angular range such that an undesirable unlocking of the locking device by the blocking bolt 51 slipping out of the recess 4 is prevented. On the contrary, the blocking bolt 51 can remain arranged in the recess of the rotating headrest rod 3 and therefore fixes the headrest rod 3. The blocking element 5 is mounted rotatably in relation to the guide sleeve 2 about the axis of rotation 102, in particular essentially by 15 degrees. The axis of rotation 102 in particular runs centrally and in the axial direction 100 through the headrest rod 3.

Figure 3:
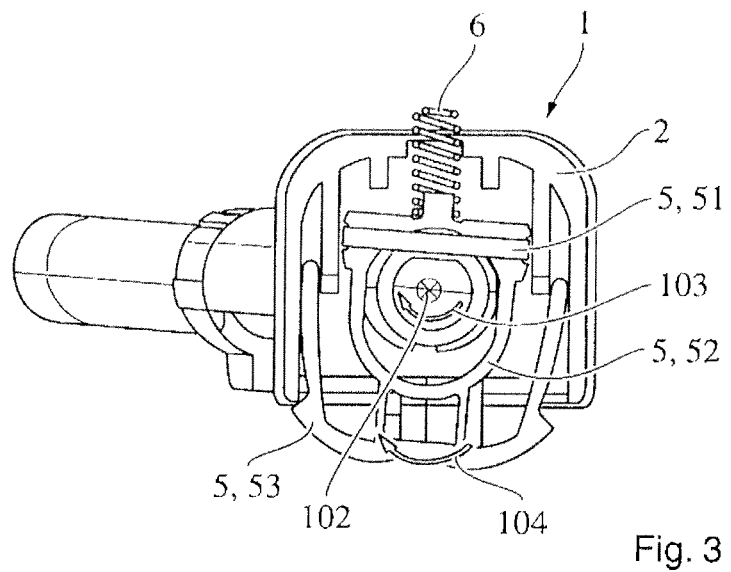
FIGS. 3 and 4 show schematic perspective views of the locking device according to the exemplary embodiment of the invention, on which a torque acts.
Figure 4:
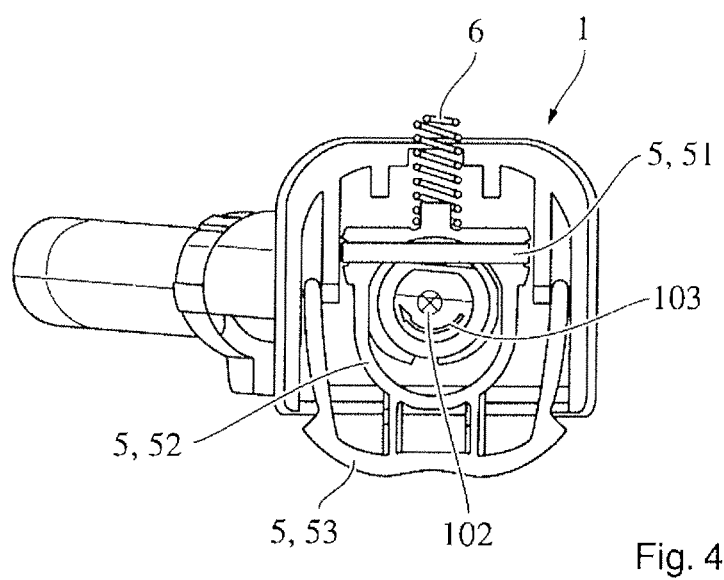

FIGS. 3 and 4 illustrate the locking device 1, which is described with reference to FIGS. 1 and 2, in a situation in which a torque 103 acts on the headrest rod 3 (FIG. 4). It can be seen from FIG. 4 that the blocking element 5 at least partially moves together with the rotating headrest rod 3, and therefore the blocking element 5 is rotated 104 in relation to the guide sleeve 2 about the axis of rotation 102. The blocking element 5 is therefore mounted in the guide sleeve 2 in such a manner that the blocking element 5 can carry out a compensating rotation in relation to the guide sleeve 2, and therefore rotation of the headrest rod 3 about the axis of rotation 102 can be at least partially compensated for.

LIST OF REFERENCE NUMBERS

1 Locking device
2 Guide sleeve
3 Headrest rod
4 Recess
5 Blocking element
6 Spring element
51 Blocking bolt
52 Actuating element
53 Outer segment
54 Inner segment
55 Web
56 Guide region
57 Limb
58 Limiting edge
21 Guide receptacle
22 Guide channels
23 Insertion edge
100 Axial direction
101 Transverse direction
102 Axis of rotation
103 Torque
104 Rotation

The invention claimed is:
1. A locking device for a headrest, comprising:
a headrest rod;
a guide sleeve for the headrest rod; and
a blocking element,
wherein the blocking element is movable relative to the guide sleeve between a locking position, in which the blocking element is in engagement with a recess in the headrest rod, and an unlocking position, in which the blocking element is disengaged from recesses in the headrest rod,
wherein the blocking element is pivotable in relation to the guide sleeve about an axis of rotation parallel to the headrest rod,
wherein the blocking element is mounted in the guide sleeve in such a manner that, during a relative rotational movement between the guide sleeve and the headrest rod caused by an accident, the blocking element at least partially rotates together with the headrest rod about the axis of rotation,
wherein the blocking element comprises a blocking bolt and an actuating element, wherein the actuating element comprises an outer segment and an inner segment, which are connected rigidly to each other,
wherein the guide sleeve has two guide channels which extend parallel to the main direction of movement and in which free limbs of the outer segment are displaceably guided, wherein the free limbs have a curvature and/or rounded edges to enable the actuating element to rotate in relation to the guide sleeve about the axis of rotation parallel to the axial direction of the headrest rod.

2. The locking device as claimed in claim 1, wherein the blocking element is mounted rotatably about the axis of rotation by an angle of between 5 and 40 degrees in relation to the guide sleeve.

3. The locking device as claimed in claim 1, wherein the outer segment is provided with rounded edges and/or is of semi-circular design.

4. The locking device as claimed in claim 1, wherein the inner segment surrounds the headrest rod and has the blocking bolt on a side facing away from the outer segment.

5. The locking device as claimed in claim 1, wherein the actuating element is movable along a main direction of movement which extends in a plane perpendicular to the axial direction of the headrest rod.

6. The locking device as claimed in claim 1, wherein the inner segment and the outer segment are coupled rigidly to each other via two webs extending parallel to the main direction of movement.

7. The locking device as claimed in claim 1, wherein a spring, which pretensions the blocking element into the locking position, is arranged on a side of the actuating element that faces away from the outer segment.

\* \* \* \* \*